United States Patent

Abe et al.

[11] Patent Number: 5,802,845
[45] Date of Patent: Sep. 8, 1998

[54] EXHAUST GAS PURIFICATION SYSTEM AND EXHAUST GAS PURIFICATION METHOD

[75] Inventors: Fumio Abe, Handa; Shigeharu Hashimoto, Okazaki; Masato Ogawa, Komaki, all of Japan

[73] Assignee: NGK Insulators, Ltd., Japan

[21] Appl. No.: 767,618

[22] Filed: Dec. 17, 1996

Related U.S. Application Data

[62] Division of Ser. No. 289,268, Aug. 11, 1994.

[30] Foreign Application Priority Data

Aug. 20, 1993 [JP] Japan .................................. 5-206534

[51] Int. Cl.$^6$ ....................................................... F01N 3/20
[52] U.S. Cl. ................................ 60/274; 60/289; 60/297
[58] Field of Search ............................. 60/274, 297, 289; 422/171, 169

[56] References Cited

U.S. PATENT DOCUMENTS

| | | | |
|---|---|---|---|
| 5,184,462 | 2/1993 | Schatz | 60/274 |
| 5,271,906 | 12/1993 | Yuuki | 60/297 |
| 5,379,586 | 1/1995 | Honji | 60/297 |
| 5,388,405 | 2/1995 | Fujishita | 60/288 |

FOREIGN PATENT DOCUMENTS

| | | |
|---|---|---|
| 0485179 | 5/1992 | European Pat. Off. . |
| 0532803 | 3/1993 | European Pat. Off. . |
| 2686375 | 7/1993 | France . |
| 4207005 | 9/1992 | Germany ................................. 60/297 |
| 5-31359 | 2/1993 | Japan . |

Primary Examiner—Douglas Hart
Attorney, Agent, or Firm—Parkhurst, Wendel & Burr, L.L.P.

[57] ABSTRACT

An exhaust gas purification system for an internal combustion engine is herein disclosed which comprises an exhaust system having an adsorption flow path provided with an adsorbent capable of adsorbing harmful components such as hydrocarbons in an exhaust gas, and a catalyst flow path provided with at least one catalyst for decreasing the harmful components in the exhaust gas, the exhaust gas purification system being characterized in that an outlet of the adsorption flow path is joined to the catalyst flow path at a predetermined position on the upstream side of the catalyst to form a joint portion; the exhaust gas produced at least at the time of the operation start of the internal combustion engine is divided so as to flow through both the adsorption flow path and the catalyst flow path in a predetermined ratio, so that part of harmful components such as the hydrocarbons are adsorbed by the adsorbent in the adsorption flow path; and when the adsorbed harmful components begin to desorb from the adsorbent with the temperature rise of the adsorbent, the catalyst on the downstream of the joint portion is activated.

29 Claims, 6 Drawing Sheets

EXHAUST GAS PURIFICATION SYSTEM AND EXHAUST GAS PURIFICATION METHOD

This is a Division of application Ser. No. 08/289,268 filed Aug. 11, 1994.

BACKGROUND OF THE INVENTION

1. Field of the Invention

The present invention relates to an exhaust gas purification system and an exhaust gas purification method for effectively purifying harmful substances present an exhaust gas, particularly hydrocarbons (HC) and the like produced in large quantities at the time of a cold start of an engine.

2. Description of the Related Art

According to an FTP test (LA-4 mode) in correspondence with the intensification of exhaust gas regulations in the United States, 70 to 80% of the total HC emission amount is emitted within 140 seconds (within the first hill of Bag 1) at the time of a cold start of an engine after engine cranking. During this period, however, considerable time is taken until a conventional three-way catalyst has reached its operation temperature, and thus most of the HC is exhausted without being purified.

In order to solve this problem, a technique has been proposed in which an electrically heated catalyst (hereinafter referred to as an EHC) and an adsorbent mainly comprising zeolite are disposed in an exhaust gas pipe.

For example, in Japanese Patent Application Laid-open No. 31359/1993, a catalyst converter for car exhaust gas purification has been disclosed in which three elements including EHC, an adsorbent and a main catalyst are arranged in series in an optional order in an exhaust gas flow path.

Additionally, SAE paper No. 920847 has suggested a by-pass system in which a valve is provided on the upstream side of an adsorbent so as to desorb HC after a catalyst has been sufficiently activated.

However, Japanese Patent Application Laid-open No. 31359/1993 does not disclose any optimum arrangement of the above-mentioned three factors for the sake of the decrease of an emission at the time of a cold start. Further, with regard to the minimization of electric power to be applied to the EHC, no consideration has been given.

Moreover, the technique employing such a by-pass system as in the SAE Paper No. 920847 suitably functions from a viewpoint of purification performance, but it has many problems from a practical viewpoint. For example, this system is intricate, and the reliability of the heat-resistant valve in the pipe is poor.

SUMMARY OF THE INVENTION

In view of the above-mentioned problems of conventional techniques, the present invention has been developed.

An object of the present invention is to provide an exhaust gas purification system and an exhaust gas purification method for effectively purifying harmful substances present in an exhaust gas, particularly HC and the like produced in large quantities at the time of a cold start of an engine without requiring an intricate system such as a by-pass system.

According to the first aspect of the present invention, there is provided an exhaust gas purification system for an internal combustion engine which comprises an exhaust system having an adsorption flow path provided with an adsorbent capable of adsorbing harmful components such as hydrocarbons in an exhaust gas, and a catalyst flow path provided with at least one catalyst for decreasing the harmful components in the exhaust gas, said exhaust gas purification system being characterized in that an outlet of the adsorption flow path is joined to the catalyst flow path at a predetermined position on the upstream side of the catalyst to form a joint portion; the exhaust gas produced at least at the time of the operation start of the internal combustion engine is divided so as to flow through both the adsorption flow path and the catalyst flow path in a predetermined ratio, so that part of harmful components such as the hydrocarbons are adsorbed by the adsorbent in the adsorption flow path; and when the adsorbed harmful components begin to desorb from the adsorbent with the temperature rise of the adsorbent, the catalyst on the downstream of the joint portion is activated.

According to the second aspect of the present invention, there is provided an exhaust gas purification method which comprises the steps of using an exhaust gas purification system for an internal combustion engine which comprises an exhaust system having an adsorption flow path provided with an adsorbent capable of adsorbing harmful components such as hydrocarbons in an exhaust gas and a catalyst flow path provided with at least one catalyst for decreasing the harmful components in the exhaust gas and in which an outlet of the adsorption flow path is joined to the catalyst flow path at a predetermined position on the upstream side of the catalyst to form a joint portion; dividing the exhaust gas produced at least at the time of the operation start of the internal combustion engine so that the exhaust gas may flow through both the paths of the adsorption flow path and the catalyst flow path in a predetermined ratio, whereby part of harmful components such as the hydrocarbons are adsorbed by the adsorbent in the adsorption flow path; and then activating the catalyst on the downstream of the joint portion, when the adsorbed harmful components begin to desorb from the adsorbent with the temperature rise of the adsorbent.

DETAILED DESCRIPTION OF THE INVENTION

As described above, an exhaust gas purification system of the present invention comprises an exhaust system having an adsorption flow path provided with an adsorbent capable of adsorbing harmful components such as hydrocarbons in an exhaust gas, and a catalyst flow path provided with at least one catalyst for decreasing the harmful components in the exhaust gas. The plural adsorption flow paths and the plural catalyst flow paths may be employed, but for the simplification of the system, it is preferable to use one adsorption flow path and one catalyst flow path.

Figure 1:
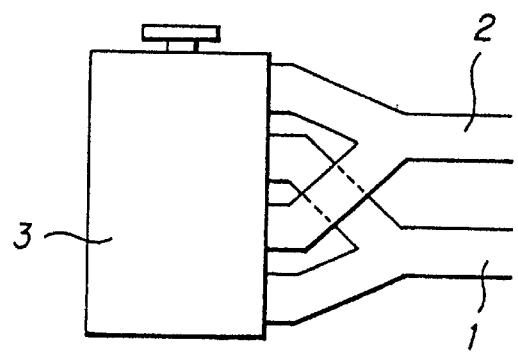
FIG. 1 shows an embodiment in which exhaust manifold orifices for a series 4-cylinder engine are divided into two portions each having two cylinders to separate an adsorption flow path and a catalyst flow path from each other.
Figure 2:
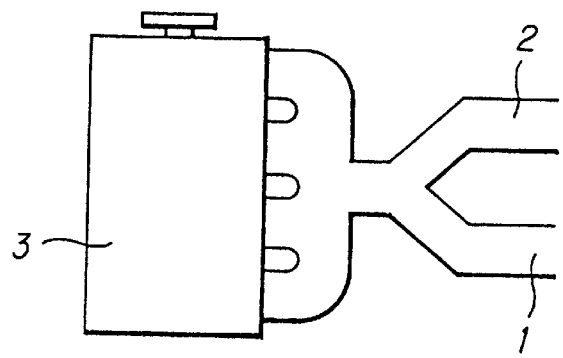
FIG. 2 shows an embodiment in which the exhaust manifold orifices for the series 4-cylinder engine are once joined and afterward divided so as to form the adsorption flow path from the catalyst flow path.
Figure 3:
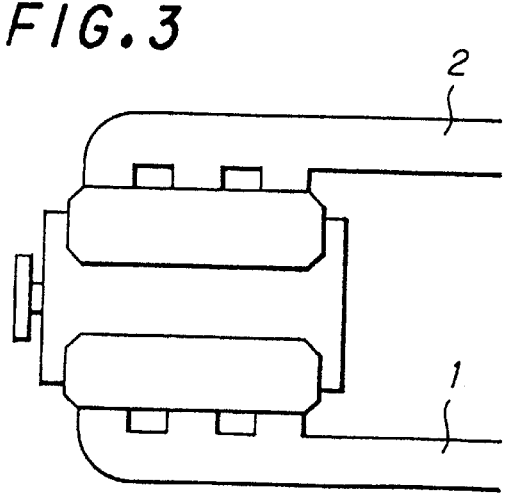
FIG. 3 shows an embodiment in which the exhaust manifold orifices for a V-type 6-cylinder engine are divided into two portions each having three cylinders to separate the adsorption flow path and the catalyst flow path from each other.

In the present invention, as shown in FIG. 1, exhaust manifold orifices of an internal combustion engine 3 may be beforehand divided so as to form an adsorption flow path 1 and a catalyst flow path 2, or as shown in FIG. 2, the exhaust manifold orifices may be once joined and then divided on its downstream side so as to form the adsorption flow path 1 and the catalyst flow path 2. In the case of the V-type engine, as shown in FIG. 3, one bank may be separated from the other bank, and these banks may be connected to the adsorption flow path 1 and the catalyst flow path 2, respectively. This constitution is desirable for the simplification of the system.

The adsorbent and the catalyst disposed in the adsorption flow path and the catalyst flow path can take an optional shape such as beads, pellets or a honeycomb structure, but the honeycomb structure is preferable from the viewpoints of a pressure loss and a purification performance. Here, the honeycomb structure means a structure having a large number of passages which are formed by partition walls and which extend in parallel with the flow direction of the gas, and it also includes a plate-like honeycomb structure. In this connection, the plural adsorbents and the plural catalysts may be disposed in the above-mentioned flow paths, respectively.

With regard to the exhaust gas purification system of the present invention, in order to purify the exhaust gas, the exhaust gas produced at least at the time of the operation start of the internal combustion engine is divided so as to flow through both the paths of the adsorption flow path and the catalyst flow path in a predetermined ratio. The ratio between the flow rates of the exhaust gas through the adsorption flow path and the catalyst flow path is optional, but the ratio of the exhaust gas flow rate through at least one flow path is in the range of 10 to 90%, preferably 30 to 70%, whereby the emission of the exhaust gas can be suitably decreased in both the paths, as described hereinafter.

The flow rate of the exhaust gas may be adjusted by optionally dividing the exhaust manifold orifices into portions for the adsorption flow path and the catalyst flow path. Alternatively, in the case that the exhaust manifold orifices may be once joined and then divided into portions for the adsorption flow path and the catalyst flow path, the flow rate of the exhaust gas can be controlled by adjusting the shape or the diameter of an exhaust pipe. In order to control the flow rate, valves for flow rate control can also be suitably used, but in this case, cost increases inconveniently.

An outlet of the adsorption flow path is joined to the catalyst flow path at a predetermined position on the upstream side of the catalyst to form a joint portion.

Part of the HC produced in large quantities at the operation start (at a cold start) of the internal combustion engine flow through the adsorption flow path, and at this time, it is adsorbed by the adsorbent. The thus adsorbed HC begin to desorb from the absorbent mainly with the rise of the temperature of the exhaust gas. At this time, the catalyst on the downstream side of the Joint portion is activated to decrease the harmful components (inclusive of the desorbed HC) in the exhaust gas, whereby the desorbed HC is suitably made harmless. In this case, for the purpose of effectively achieving the above-mentioned activation of the catalyst, the joint portion of the adsorption flow path and the catalyst flow path is formed.

When the HC begin to desorb from the adsorbent, it is preferable that the temperature of the catalyst on the downstream side of the joint portion desirably has reached 150° C. or more, preferably 250° C. or more. For the acquisition of such a state, the exhaust gas purification system should be designed in consideration of the volumes and the positions of the exhaust pipe, the adsorbent and the catalyst.

In order to suitably decrease the HC produced at the time of the cold start, it is important that at least the catalyst in the catalyst flow path ignites early. Usually, a combustion reaction by the catalyst scarcely occurs in a fuel rich region formed at the time of the cold start, and in addition, a heating acceleration effect by heat of the reaction cannot be expected. Therefore, it is necessary to install an oxidizing gas feed means (e.g., a secondary air feed means) for feeding an oxidizing gas (e.g., secondary air) from the upstream side of the catalyst, or a fuel-combustion air adjustment means (A/F adjustment means) for adjusting the amount of a fuel and the amount of combustion air, thereby adjusting the composition of the exhaust gas to be in an oxygen-excess state at the time of the cold start.

Here, the oxygen-excess exhaust gas composition means a composition is oxygen rich with respect to an exhaust gas composition at the time of the cold start of the usual internal combustion engine having no specific control means. Specifically, in the case of a gasoline engine, an air-fuel ratio is shifted to a lean side of 14.0 (a weak reduction side) or more, preferably 14.6–19.0 (an equivalent point to an oxidation side). When the air-fuel ratio is shifted to the lean side in this way, the oxidizing activity of the catalyst can be remarkably improved. In the case that a reformed gasoline or methanol is used as the fuel, a theoretical air-fuel ratio itself changes, and therefore, in such a case, the above-mentioned air-fuel ratio is converted by the use of an equivalent ratio λ. Accordingly, the air-fuel ratio of the reformed gasoline or methanol is also preferably shifted to the lean side of the thus converted value.

When the HC adsorbed by the adsorbent begins to desorb from the adsorbent, the exhaust gas composition temporarily shifts to the reduction side. Therefore, even if the catalyst on the downstream side of the joint portion has reached an ignition temperature, the combustion reaction of the desorbed HC is insufficient on occasion. In consequence, it is necessary that at least one oxidizing gas feed means and/or fuel-combustion air adjustment means is installed in front (on the upstream side) of the catalyst on the downstream side of the joint portion to obtain an oxygen-excess exhaust gas composition capable of effectively burning the desorbed HC by the catalyst.

That is to say, for the two purposes of early igniting the catalyst in the catalyst flow path and suitably removing the HC desorbed from the adsorbent with the aid of the catalyst on the downstream side of the joint portion, the oxidizing gas feed means and/or the fuel-combustion air adjustment means is required.

Detecting means capable of detecting that the HC adsorbed by the absorbent have begun to desorb from the adsorbent, for example, an $O_2$ sensor or an HC sensor is preferably installed at least between the adsorbent and the joint position, whereby the desorption of the HC can be detected by this detecting means, and in accordance with a signal therefrom, the oxidizing gas introduction means and/or the fuel-combustion air adjustment means is operated.

In order to early ignite the catalyst in the catalyst flow path, the oxidizing gas feed means or the fuel-combustion air adjustment means is usually operated in accordance with the signal from the $O_2$ sensor for A/F adjustment arranged at a foremost position of the catalyst in the catalyst flow path, or in accordance with a beforehand prepared external program for avoiding the rich region which is formed at the time of the cold start. In this case, both of the oxidizing gas feed means and the fuel-combustion air adjustment means may be installed.

Furthermore, in order to suitably burn the HC desorbed from the adsorbent with the aid of the catalyst on the downstream of the joint portion, the oxidizing gas feed means can be installed at one optional position in front (on the upstream side) of the catalyst on the downstream side of the joint portion, but this means can also serve as the oxidizing gas feed means for the early ignition of the catalyst, or alternatively, the former means may be installed separately from the latter means. In the case that a plurality of the oxidizing gas feed means are installed, they may be separately or together controlled.

For the purpose of suitably removing harmful components such as HC, CO, $NO_x$ and the like discharged from the internal combustion engine, the catalyst in the catalyst flow path preferably comprises a honeycomb structure of a heat-resistant inorganic material coated with a catalyst layer of a heat-resistant oxide containing at least a noble metal such as Pt, Pd or Rh. The material of the honeycomb structure is preferably cordierite or ferrite-based stainless steel in the viewpoints of heat resistance and thermal shock resistance.

Each of these noble metals, when used, is supported on a heat-resistant oxide such as $Al_2O_3$, $SiO_2$, $TiO_2$ or $ZrO_2$, or a composite oxide thereof. It is particularly preferable to use $Al_2O_3$ having a specific surface area of 100 $m^2/g$ or more, because the noble metal can be supported in a highly dispersed state, so that low-temperature ignition properties and heat resistance are improved.

In addition, it is also particularly preferable to further add 5 to 30 wt % of an oxide having an oxygen storage ability such as $CeO_2$, $La_2O_3$ or $CeO_2$—$ZrO_2$ to the above-mentioned heat-resistant oxide, because a steady activity can be improved.

The total amount of the supported noble metal in the catalyst is in the range of 20 to 130 $g/ft^3$, and the amount of the supported Rh is preferably in the range of 2 to 30 $g/ft^3$.

The adsorbent in the adsorption flow path is preferably the honeycomb structure of the above-mentioned heat-resistant inorganic material which is coated with an adsorption layer mainly comprising zeolite.

As the materials which can adsorb harmful components such as the HC, there are zeolite, active carbon and the like. When the adsorbent is disposed in an exhaust system without using a by-pass system, the heat resistance of at least 500° C. is necessary, and so the employment of the zeolite is preferable.

In the present invention, the natural and synthetic zeolites are acceptable, and no particular restriction is put on the kind of zeolite. However, the zeolite having an Si/Al molar ratio of 40 or more can be suitably used from the viewpoints of heat resistance, durability and hydrophobic nature. Typical examples of the usable zeolite include ZSM-5, USY, β-zeolite, silicalite and metallosilicate.

These zeolites may be used singly or in combination. For example, the zeolite ZSM-5 having relatively small micropores of about 0.55 nm is advantageous to adsorb the small molecules of propene or the like but disadvantageous to adsorb the large molecules of toluene, xylene or the like. On the contrary, the zeolite USY having relatively large micropores of about 0.74 nm is disadvantageous to adsorb the small molecules of propene or the like but advantageous to adsorb the large molecules of toluene, xylene or the like. Therefore, it is one of suitable manners to coat the honeycomb structure with a mixture of ZSM-5 and USY. Alternatively, ZSM-5 and USY may be separately supported along a gas flow direction. In this case, it is preferable to support ZSM-5 on the upstream side, because ZSM-5 can adsorb and hold the HC even at a relatively high temperature of 150° C. or less.

The zeolite can be singly used as the adsorbent, but in order to control coking which occurs at the time of the adsorption of the HC and the like at the elevated temperature, it is preferred that one or more of noble metals such as Pt, Pd and Rh are supported on the zeolite, whereby the adsorption performance of the zeolite can be recovered without any deterioration.

As the noble metal which can be supported on the zeolite, Pd is preferable, because it is the least expensive and has a high recovery ability. In order to support the novel metal on the zeolite, an ion exchange method is preferable from the viewpoint of thermal stability. The amount of the noble metal to be supported is preferably in the range of 5 to 40 $g/ft^3$ (the volume of the honeycomb) from the viewpoints of the cost and the recovery ability. In the case that the zeolite is supported on the honeycomb structure,5 to 20 wt % of an inorganic binder such as $Al_2O_3$ or $SiO_2$ may be contained in the honeycomb structure, whereby the zeolite can be strongly supported without impairing the HC adsorbing performance.

As is apparent from the foregoing, when supported on the zeolite, the noble metal has not only the recovery ability of the zeolite but also a catalytic function. However, the noble metal in the zeolite is liable to sinter, and so it is poor in durability as the catalyst. Therefore, the catalyst component constituting a catalyst layer which is used as the catalyst may be included in an adsorbent layer comprising a zeolite layer, or the adsorbent layer may be coated with the catalyst layer. In this case, since containing the durable catalyst component, the adsorbent can suitably and conveniently exert the purification performance even during steady drive after the cold start. The addition of the catalyst component leads to the effect of inhibiting the coking of the zeolite, and therefore it is not always necessary to add the noble metal to the zeolite.

As one preferable adsorbent example in which the surface of the adsorption layer is coated with the catalyst layer, there is a layer type catalyst-adsorbent in which the surface of the honeycomb structure is coated with a high silica zeolite such as ZSM-5 , USY or β-zeolite having the supported noble metal as a first layer, and the surface of the first layer is further coated with an $Al_2O_3$—$CeO_2$ composite oxide having the supported noble metal as a second layer.

In such a layer type catalyst-adsorbent, $Al_2O_3$ which is the main component of the second layer has the effect of a predryer for selectively adsorbing $H_2O$ contained in the exhaust gas at the time of the cold start, and thus this $Al_2O_3$ enhances the adsorption of the HC which the first layer takes charge of. In addition, with the rise of the exhaust gas temperature, the second layer containing the catalyst component on the surface layer side is first heated, and at a time when the zeolite component in the first layer desorbs the adsorbed HC and the like, the catalyst component in the second layer suitably functions. It is essential that at the time of the desorption of the HC and the like, an exhaust gas is in the oxygen-excess state by the addition of the oxidizing gas or the adjustment between the amount of combustion air and that of the fuel, whereby the catalyst function of the second layer can be remarkably improved.

Even if the catalyst component having the supported noble metal and the zeolite component are supported on the honeycomb structure in the mixed state instead of in the layer structure, they can function relatively well.

A weight ratio of the zeolite component to the catalyst component is 50–85:15–50, and it is preferable that a larger amount of the zeolite component is contained. On the honeycomb structure, the amount of the zeolite component to be supported is in the range of 0.05 to 0.25 g/cc, and that of the catalyst component is in the range of 0.02 to 0.20 g/cc.

In the present invention, it is preferred that at least one electrical heater (hereinafter referred to as "EH") is installed in the exhaust system, particularly in the catalyst flow path for the purpose of achieving the early ignition of the catalyst.

The EH is preferably constituted by attaching a pair of electrodes for electrification to the honeycomb structure comprising a heat-resistant metal such as ferrite from the viewpoint of pressure loss and heat resistance. More preferably, this EH can be further coated with the catalyst layer comprising the heat-resistant inorganic oxide containing at least the noble metal to form an EHC (i.e., a catalyst), and in this case, electric power required to heat the heater can be decreased with the aid of the reaction heat of the catalyst.

The EH can be arranged at an optional position in the catalyst flow path, but it is more preferable that the EH is placed on the upstream side of the catalyst flow path, because the exhaust heat of the exhaust gas can be more effectively utilized, so that the whole catalyst in the catalyst flow path can be ignited in a short period of time by a reduced application of electric power. For example, the EH is suitably installed in front (upstream) of the joint portion of the adsorption flow path and the catalyst flow path.

On the other hand, if the EH is installed at the rear (downstream) of the joint portion of the adsorption flow path and the catalyst flow path, the EH is cooled by the exhaust gas coming through the adsorption flow path, and so the relatively large electric power applied is required. However, the HC desorbed from the adsorbent can be conveniently completely purified by the downstream EH or the catalyst heated by the EH and placed on the downstream side of the EH.

When arranged on the most downstream of the catalyst, the EH is required to be installed in the form of the EHC in which the EH is coated with the catalyst layer.

On the other hand, it is possible to arrange the EH also in the adsorption flow path for the purpose of controlling the desorption of the HC from the adsorbent. The EH can be arranged at an optional position in the adsorption flow path, but it is preferable that the EH is placed on the upstream side of the adsorption flow path, because the exhaust heat of the exhaust gas can be more effectively utilized, so that the operation can be carried out by a low electric power.

In the case that the adsorbent contains the catalyst component, the EH can be arranged on the upstream side of the adsorbent, whereby the desorption of the HC can be controlled and the ignition of the catalyst component in the adsorbent can also be accelerated. In consequence, the HC desorbed from the adsorbent component can be purified by the catalyst component in the adsorbent, which leads to the improvement of the purification performance. For the same purpose, the EH can be coated with the adsorption layer, and the catalyst component may be included in this adsorption layer.

When the EH is arranged on the downstream side of the adsorbent, a relatively large electric power is required, and the HC desorbed from the adsorbent is heated. Thus, the cooling of the catalyst on the downstream side of the joint portion is restrained. In the case that the EH is used in the form of the EHC in which the EH is coated with the catalyst layer, at least partially desorbed HC can be purified with the catalyst component on the EH.

As described above, a plurality of the EHs and/or the EHCs can be installed at the optional positions in the catalyst flow path or the adsorption flow path. However, the arrangement of a plurality of the EHs and/or the EHCs gives rise to the increase in the electric power to be applied, and so it is preferable to install one EH or EHC in either of these flow paths.

The adsorption flow path may be provided with a by-pass valve so as to form a by-pass flow path at a time other than the cold start, but it is more preferable that the exhaust gas is all purified in the in-line system instead of using the by-pass valve.

In the exhaust gas purification method of the present invention, the activation of the catalyst in the purification system can be accomplished by feeding an oxidizing gas into the system. Examples of the usable oxidizing gas include ozone, $O_2$ and secondary air, and among these examples, the secondary air is most preferable, because it can be fed thereto by a simple device such as an air pump.

The feed of the oxidizing gas is done at a time when the catalyst has been heated to at least about 150° C. by the exhaust heat of the exhaust gas or the EH, in the case that the early ignition is intended. When the catalyst is arranged in the vicinity of an engine, the catalyst can be rapidly heated by the exhaust heat of the exhaust gas, and so the oxidizing gas may be fed substantially simultaneously with the start of the engine. The feed of the oxidizing gas is usually stopped at a time when an $O_2$ sensor for the A/F adjustment works after the warming up of the engine and the operation is performed in an equivalent ratio. In the case of the $O_2$ sensor having a heater, the feed of the oxidizing gas is stopped at a time when 20 to 50 seconds have elapsed after engine cranking, and in the case of the $O_2$ sensor having no heater, it is done at a time when 40 to 140 seconds have elapsed after the engine cranking.

On the other hand, the feed timing of the oxidizing gas which is fed so as to effectively burn the HC desorbed from the adsorbent with the catalyst on the downstream of the joint portion is detected by the use of detecting means (the $O_2$ sensor or an HC sensor) on the downstream side of the adsorbent. The amount of the oxidizing gas to be fed is such that the exhaust gas composition is in the oxygen-excess state with respect to the catalyst on the downstream of the joint portion, and this amount can also be controlled by feeding back an output from the detecting means. In general, when the temperature of the absorbent is in excess of 80°–100° C., the HC begins to desorb, and so the feed of the oxidizing gas is begun within 50 seconds from the engine cranking, depending upon the position of the adsorbent. The stop of the feed is made at a time when 40 to 140 seconds have elapsed from the engine cranking.

The amount of the oxidizing gas to be fed is in the range of about 50 to 300 l/min, depending upon an engine displacement. If the oxidizing gas is excessively fed, the downstream catalyst is cooled. Hence, it is most preferable that the oxidizing gas is fed in such an amount that the air fuel-ratio may be in the vicinity of an equivalent point. The amount of the oxidizing gas to be fed may be constant or suitably changed.

The oxygen-excess exhaust gas composition can also be obtained by a driving manner of the engine, i.e., by adjusting the amount of combustion air and that of the fuel, in addition to the feed of the oxidizing gas, and in this case, a similar effect can be obtained. For example, there are a method which comprises feeding the fuel in an amount smaller than a theoretical amount with respect to an air amount detected by an air flow sensor in an open-loop control (using no $O_2$ sensor) after the ignition of the engine; a method which comprises controlling the air-fuel ratio by the use of the $O_2$ sensor and a computer so that this ratio may be, for example, on a lean side for a certain period of time; and a method which comprises controlling the air-fuel ratio by the use of a PEGO sensor in which a sensor output linearly changes in accordance with the air-fuel ratio, so that this ratio may be, for example, on the lean side for a certain period of time.

At the time of the ignition of the engine, a fuel rich state is taken for the sake of operativity, and so a device capable of controlling the exhaust gas composition by using the above-mentioned method is required in addition to the usual system. The method for controlling the exhaust gas composition by the use of the sensor is excellent in accuracy, but much time is taken to warm up the sensor itself. This inconvenience can be fairly reduced by the use of the sensor having a heater, but in order to obtain the oxygen-excess exhaust gas composition relatively promptly, it is preferable to feed the oxidizing gas or to use a control device other than the sensor. In addition, the simultaneous utilization of the feed of the oxidizing gas and the adjustment of the combustion air amount and the fuel amount is also one means suitable to obtain the oxygen-excess exhaust gas composition.

Now, an exhaust gas purification system of the present invention will be described in more detail with reference to attached drawings showing preferable constitutional embodiments.

SYSTEM A

Figure 4:
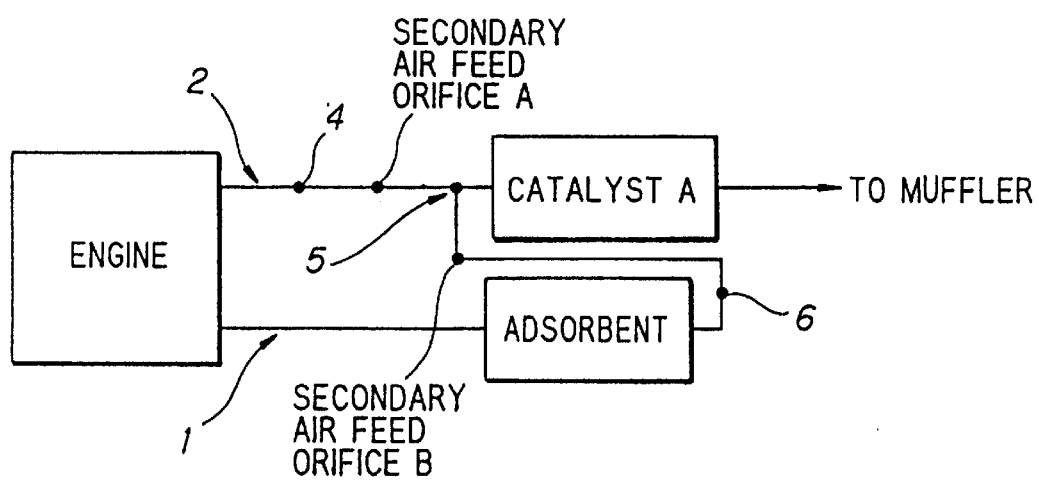
FIGS. 4 to 11 show constitutional embodiments of an exhaust gas purification system of the present invention.

As shown in FIG. 4, in this system, an exhaust gas discharged through exhaust manifold orifices of an engine is divided so as to flow through a catalyst flow path 2 and an adsorption flow path 1. On the most upstream side of the catalyst flow path 2, an $O_2$ sensor 4 for A/F adjustment is arranged. The $O_2$ sensor 4 can precisely measure the state of the exhaust gas discharged from the engine and control an air fuel ratio, and it can also be placed at a foremost position of the adsorption flow path 1. On the downstream side of the $O_2$ sensor 4, a secondary air feed orifice A for catalyst ignition acceleration is provided. The feed timing and the amount of the secondary air through the secondary air feed orifice A can be controlled by picking up signals from the $O_2$ sensor 4, if necessary. A catalyst A is placed on the downstream of the secondary air feed orifice A and a joint portion 5 of the catalyst flow path 2 and the adsorption flow path 1. For early ignition, the position of the catalyst A is preferably in the vicinity of the engine. The volume of the catalyst A is in the range of about 50 to 200% of the displacement of engine. The catalyst A may be constituted of a single honeycomb structure or a plurality of the honeycomb structures.

In the adsorption flow path 1, an adsorbent is placed, and on its downstream side, an $O_2$ sensor 6 (for monitoring the desorption of HC) is installed. On a further downstream side thereof, a secondary air feed orifice B for accelerating the combustion of the desorbed HC is placed. The feed timing and the amount of the secondary air through the secondary air feed orifice B can be controlled by picking up signals from the $O_2$ sensor 6, if necessary. The volume of the adsorbent is in the range of about 50 to 200% of the displacement of the engine. The adsorbent may be constituted of a single honeycomb structure or a plurality of the honeycomb structures. The adsorbent is preferably placed on the downstream side where it is scarcely heated by the exhaust gas, from the viewpoint of an adsorption performance. However, if the timing of the desorption of the HC is too late, the inconvenient emission of $NO_x$ tends to occur owing to the feed of the secondary air for the combustion of the desorbed HC. In consequence, the adsorbent is placed at a position where the desorption of the HC can be completed within the hill mode of Bag 1 at the time of the cold start of an FTP test, i.e., within 140 seconds form the cold start.

The most important requirement of the present invention is that the system is built up so that the catalyst A on the downstream of the joint portion 5 becomes an activated (ignited) state at the beginning of the HC desorption from the adsorbent. In order to meet this requirement, the volume of the adsorbent, the volume of the catalyst, the length of the adsorption flow path and the like are totally designed, whereby the HC desorbed from the adsorbent can be suitably purified by the catalyst A on the downstream side of the joint portion 5 to decrease emissions.

In an application of the system A, the joint portion 5 can be formed between the $O_2$ sensor 4 and the secondary air feed orifice A, and the secondary air feed orifice B is omitted, so that the secondary air feed orifice A can be caused to also serve as the secondary air feed for accelerating the combustion of the desorbed HC.

Furthermore, if the adsorption.desorption process of the adsorbent is beforehand recognized, the $O_2$ sensor 6 can be easily omitted.

In this system A, the secondary air feed means is used to obtain an oxygen-excess exhaust gas composition, but a fuel-combustion air adjustment means can be installed instead of the secondary air feed means, and in this case, the secondary air feed orifices A and B are not required any more.

SYSTEM B

Figure 5:
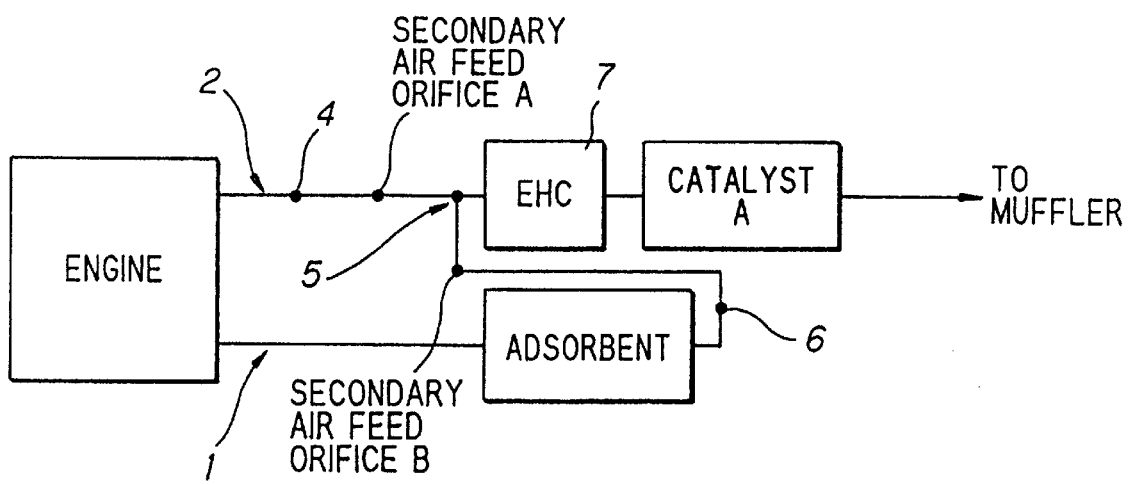

As shown in FIG. 5, an EH (or an EHC) 7 can be placed on the upstream side of a catalyst A and on the downstream of a joint portion 5 in a catalyst flow path 2. In this case, it is preferable from the viewpoint of a purification performance to use the EHC obtained by coating a catalyst layer on the EH comprising a honeycomb structure.

In comparison with System A, this System B can surely control the catalyst layer on the heater or the catalyst A on the downstream side of the heater with the aid of the EH (or the EHC) so that the catalyst may attain an active state prior to the desorption of HC from an adsorbent, whereby a suitable purification performance can be obtained. In addition, a design latitude of the adsorbent flow path and the like in System B is larger than in System A.

Figure 12:
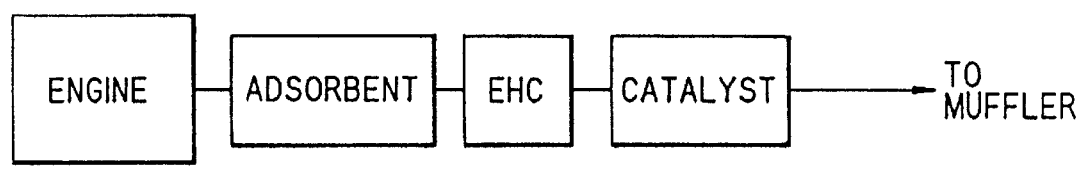
FIG. 12 shows a constitutional embodiment of a conventional exhaust gas purification system.

As shown in Japanese Patent Application Laid-open No. 31359/1993, in a system (FIG. 12) in which the exhaust gas flow path and the adsorption flow path are not divided into each other and the adsorbent, the EH (or the EHC) and the catalyst are arranged in series, all of an exhaust gas is passed through the adsorbent. Therefore, a larger amount of electric power to be applied to the electrical heater is necessary, and an enlarged volume of the adsorbent is also necessary.

SYSTEM C

Figure 6:
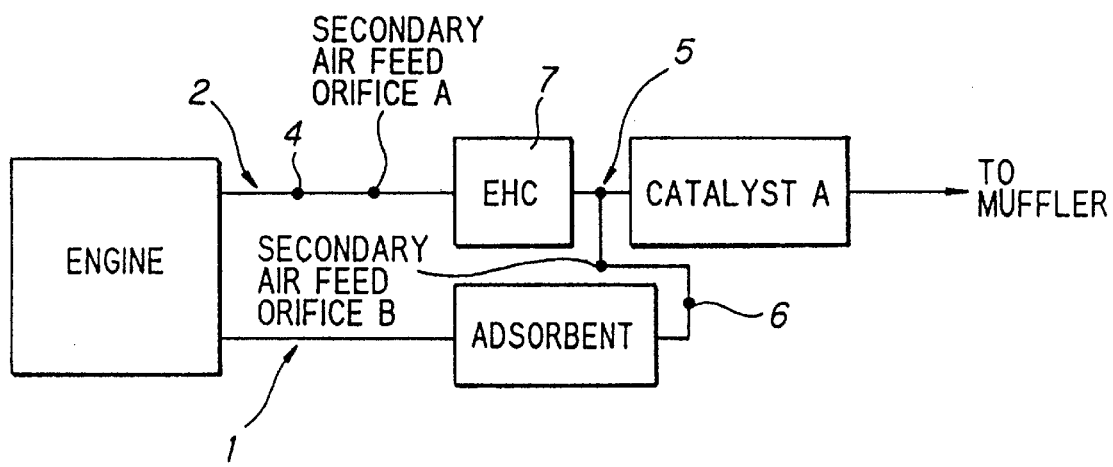

As shown in FIG. 6, System C is an embodiment in which a joint portion 5 is formed between an EH (or an EHC) 7 and a catalyst A. In comparison with System B, this System C is more preferable in that electric power to be applied can be decreased. In the case that an EHC obtained by coating the EH comprising a honeycomb structure with a catalyst layer is used, a catalyst on the heater ignites, and the catalyst A on the downstream of the joint portion 5 is heated with heat of its reaction, which makes rapid ignition possible. Thus, a suitable purification performance can be obtained.

SYSTEM D

Figure 7:
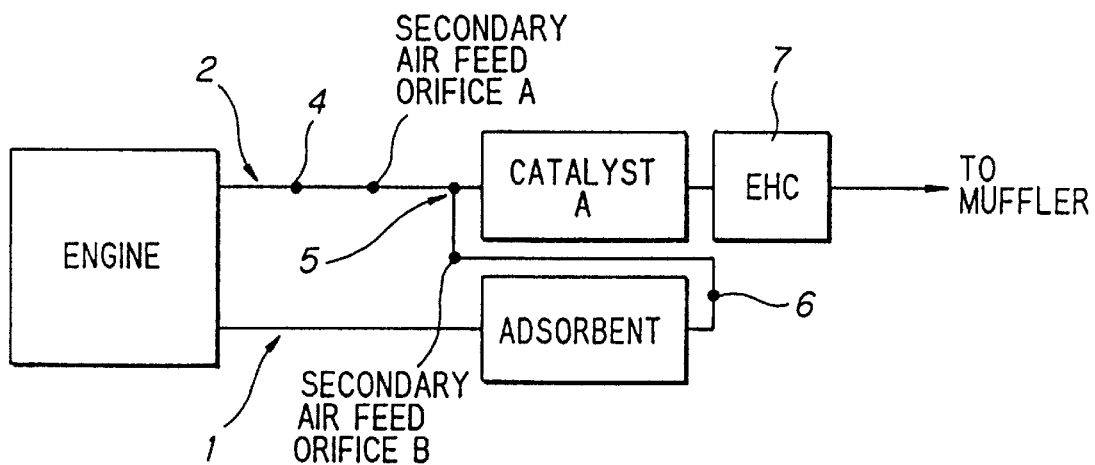

As shown in FIG. 7, System D is an embodiment in which an EHC 7 is arranged on the most downstream side of a catalyst flow path 2. In this case, it is necessary to use the EHC obtained by coating an EH with a catalyst layer. With regard to electric power to be applied to the heater, this System D is more disadvantageous as compared with Systems B and C, but System D is effective in that the catalyst layer on the heater on the most downstream side can surely purify HC.

SYSTEM E

Figure 8:
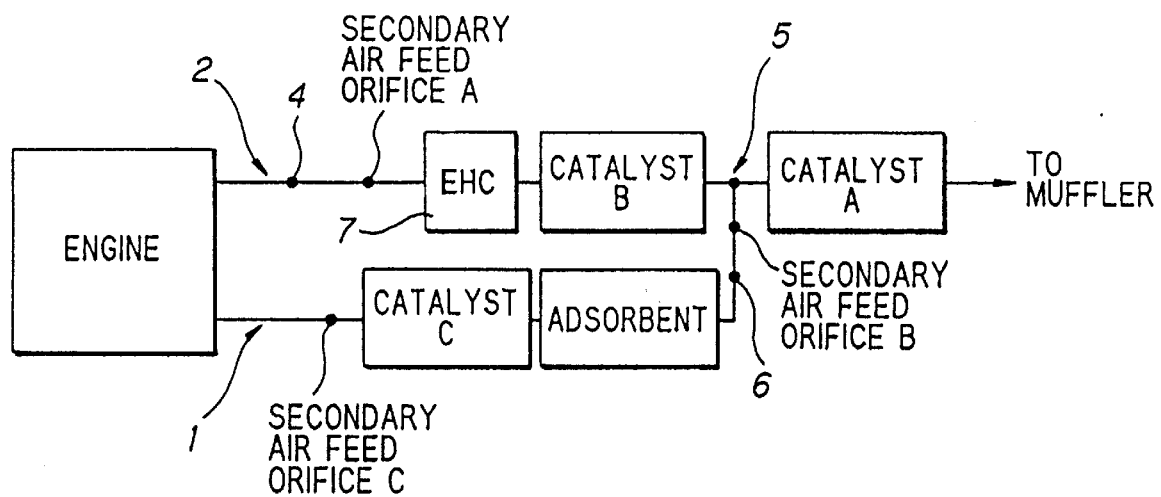

System E shown in FIG. 8 is an application of System C. In this system, there is used an EHC 7 obtained by coating an EH comprising a honeycomb structure with a catalyst layer. A catalyst B is arranged immediately on the downstream side of the EHC 7. By the utilization of reaction heat obtained by the ignition of the catalyst layer of the EHC 7, a relatively small catalyst B (which is larger than the EHC) ignites, so that large reaction heat is generated, with the result that a further downstream catalyst A ignites. In this case, the EHC is used, so to speak, as an ignition source. Thus, System E can be miniaturized more than System C, and therefore it can be operated by a low electric power. On the other hand, on the most upstream side of an adsorption flow path 1, a secondary air feed orifice C is provided, and a small catalyst C and an adsorbent are arranged in series. Furthermore, on the downstream side of the adsorption flow path 1, an $O_2$ sensor 6 and a secondary air feed orifice B are arranged, if necessary, and on the further downstream side of these members, a joint portion 5 is formed.

At the time of cold start, the secondary air is fed through the secondary air feed orifice C, and the small catalyst C ignites early to accelerate the desorption of HC form the absorbent. In comparison with a case where no catalyst C is present, a cooling effect on a catalyst A on the downstream side of the joint portion 5 is smaller, which is preferable. The adsorbent containing a catalyst component is preferable, and the adsorbent comprising an adsorption layer and a catalyst layer with which the adsorption layer is coated is more preferable. In this case, the adsorbent rapidly ignites, which is very preferable from the viewpoint of a purification performance.

The volumes of the catalyst A, B and C are usually 0.5–4 l, 0.2–1.0 l and 0.1–0.3 l, respectively, and the volume of the EHC is usually 0.025–0.2 l and that of the adsorbent is usually about 0.5–2.0 l.

SYSTEM F

Figure 9:
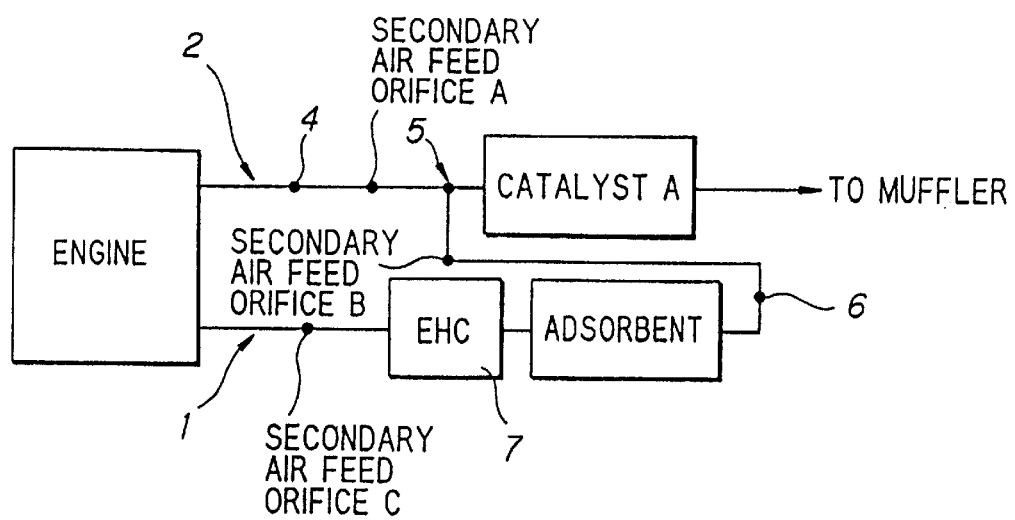

As shown in FIG. 9, System F is an embodiment in which an EH (or an EHC) 7 is contained in an adsorption flow path 1. As described above, it is more preferable from the viewpoint of purification performance to use the EHC obtained by coating the EH with a catalyst layer. In this case, for the purpose of achieving the early ignition of the EHC 7, a secondary air feed orifice C is provided on the upstream side of the EHC 7. An adsorbent on the downstream side of the EHC preferably contains a catalyst component.

In the case of System F, the heater can be electrified substantially simultaneously with engine cranking for the sake of the early ignition, or it can be electrified after a lapse of a certain period of time from the engine cranking for the sake of the desorption acceleration of adsorbed HC.

SYSTEM G

Figure 10:
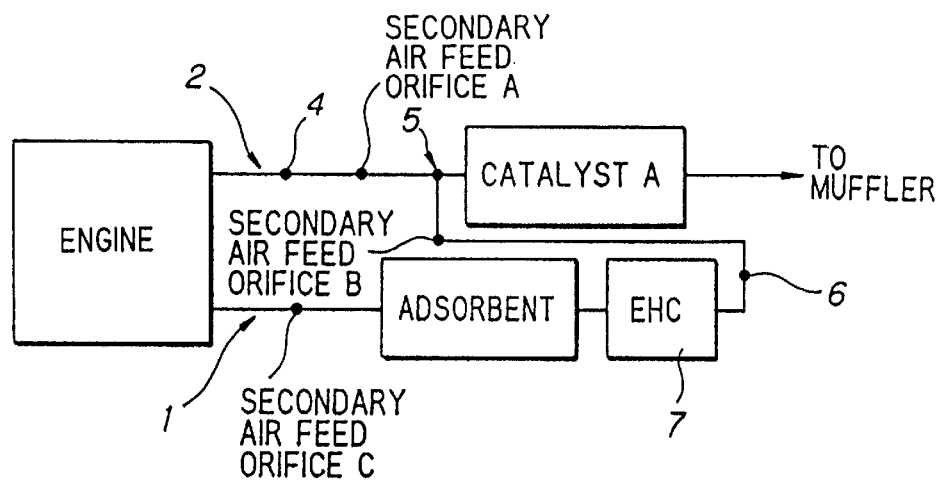

As shown in FIG. 10, System G is an embodiment in which an EH (or an EHC) 7 is arranged on the downstream side of an adsorbent. In the case of using the EHC obtained by coating the EH with a catalyst layer, HC desorbed from the adsorbent can be purified by the catalyst on the heater and gives a heating effect to a catalyst A on the downstream side of a joint portion 5. Thus, System G is preferable from the viewpoint of purification performance but has a drawback that electric power to be applied to the heater increases.

SYSTEM H

Figure 11:
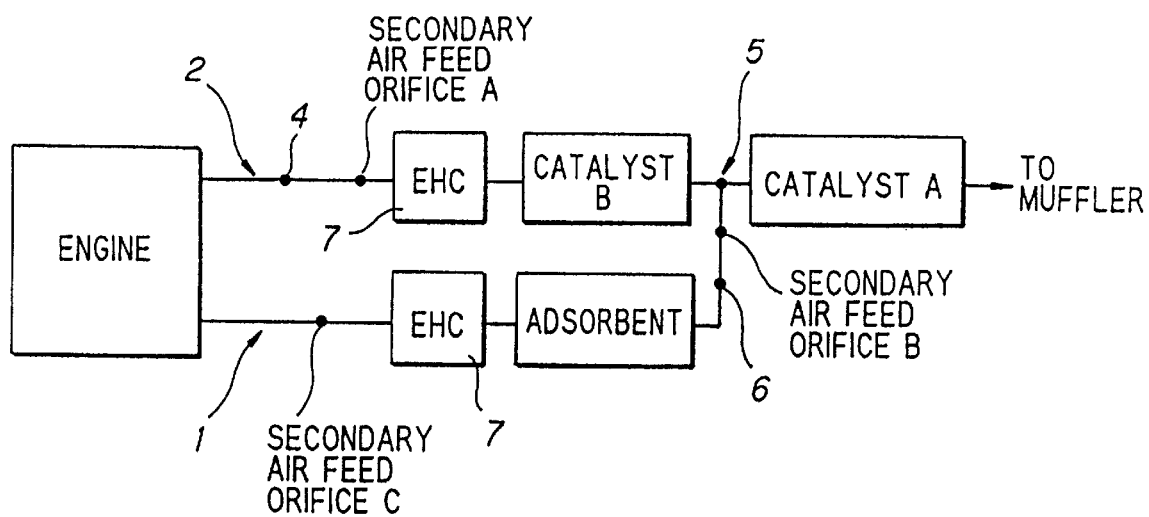

System H is an application of System E, and as in FIG. 11, this system is an embodiment in which EHCs 7 are arranged in both of an adsorption flow path 1 and a catalyst flow path 2. System H is excellent in purification performance as in System E, but owing to the installation of the two EHCs 7, electric power to be applied increases and the system is also intricate.

Next, the present invention will be described in more detail with reference to examples, but the scope of the present invention should not be limited to these examples.

Preparation of Catalysts

Cerium acetate and cerium oxide were each added in an amount of 30 wt % in terms of an oxide to commercially available $\gamma$-$Al_2O_3$ having a specific surface area of 200 m$^2$/g, and they were then ground in a wet state, followed by drying and then calcining at 550° C. to obtain a composite oxide of $Al_2O_3 \cdot CeO_2$. Next, the thus obtained composite oxide was impregnated with noble metals of Pt, Rh and Pd by the use of aqueous solutions of $H_2PtCl_6$, $Rh(NO_3)_3$ and $(NH_3)_4PdCl_2$, followed by drying and then firing at 500° C. to obtain an $Al_2O_3 \cdot CeO_2$ powder supporting the noble metals. Furthermore, water and acetic acid were separately added to this $Al_2O_3 \cdot CeO_2$ powder supporting the noble metals, and 0.20 g/cc of the resultant mixture was then applied and supported on a cordierite carrier made by NGK Insulators, Ltd. (4.66 inches or 3.66 inches in diameter, 6 mil/400 cpi$^2$). Finally, the carrier was fired at 500° C. to prepare catalysts A, B and C. In this case, the amount of the supported noble metals in the catalysts was 80 g/ft$^3$ (Pt/Pd/Rh=5/5/1). The shapes of volumes of the catalysts A, B and C were as follows:

Catalyst A . . . Diameter=4.66 inches, 1.7 l×2=3.4 l
Catalyst B . . . Diameter=3.66 inches, 1.2 l×1=1.2 l
Catalyst C . . . Diameter=3.66 inches, 0.2 l×1=0.2 l
Preparation of Adsorbents In the first place, an aqueous $(NH_3)_4PdCl_2$ solution was added to a commercially available ZSM-5 ($SiO_2/Al_2O_3$ molar ratio=280) powder, and ion exchange was then carried out with stirring, while a temperature of 80° to 90° C. was maintained. After the ion exchange, the obtained powder was dried and then calcined at 500° C. to obtain a zeolite powder containing Pd. Next, water and 5% of $Al_2O_3$ sol in terms of an oxide were added to the thus obtained powder, and a small amount of acetic acid was further added thereto, followed by wet grinding for 15 hours by a ball mill, to obtain a carrier slurry.

Next, a cordierite carrier made by NGK Insulators, Ltd. (3.66 inches in diameter, 6 mil/400 $cpi^2$, 1.2 l) was immersed in the obtained carrier slurry so that the slurry might be supported on the carrier in a ratio 0.15 g/cc, followed by drying and then firing at 500° C. to obtain an adsorbent A on which Pd-ZSM-5 was supported. In this case, the amount of the supported Pd in the adsorbent A was 10 $g/ft^3$.

On the other hand, another slurry to be supported was prepared from an $Al_2O_3 \cdot CeO_2$ powder supporting Pd, Pd and Rh in accordance with the same procedure as in the above-mentioned catalyst preparation. Next, this slurry was applied and supported as a catalyst layer on the above-mentioned adsorbent A in a ratio of 0.10 g/cc to obtain an adsorbent B. The amount of the supported noble metals in the catalyst layer of the adsorbent B was 80 $g/ft^3$ (Pt/Pd/Rh=5/5/1).

Preparation of Electrical Heater

An Fe powder, a Cr-30 Al powder (wt %), an Fe-50 Al powder (wt %), an Fe-20 B powder (wt %) and a $Y_2O_3$ powder having average particle diameters of 44 $\mu$m or less were mixed so as to obtain a composition of Fe-18 Cr-8 Al-0.05 B-0.5 $Y_2O_3$. Next, 4 g of methyl cellulose as an organic binder and 1 g of oleic acid as an antioxidant were added to 100 g of the composition, followed by mixing. Next, the resultant mixture was extruded to form a cylindrical honeycomb article, and the thus formed honeycomb article was dried at 90° C. for 16 hours in the atmosphere, fired at 1,325° C. for 2 hour under a hydrogen atmosphere, and then subjected to a heat treatment at 1,150° C. for 30 minutes to obtain a honeycomb structure. The thus obtained honeycomb structure had a porosity of 3%.

Figure 13:
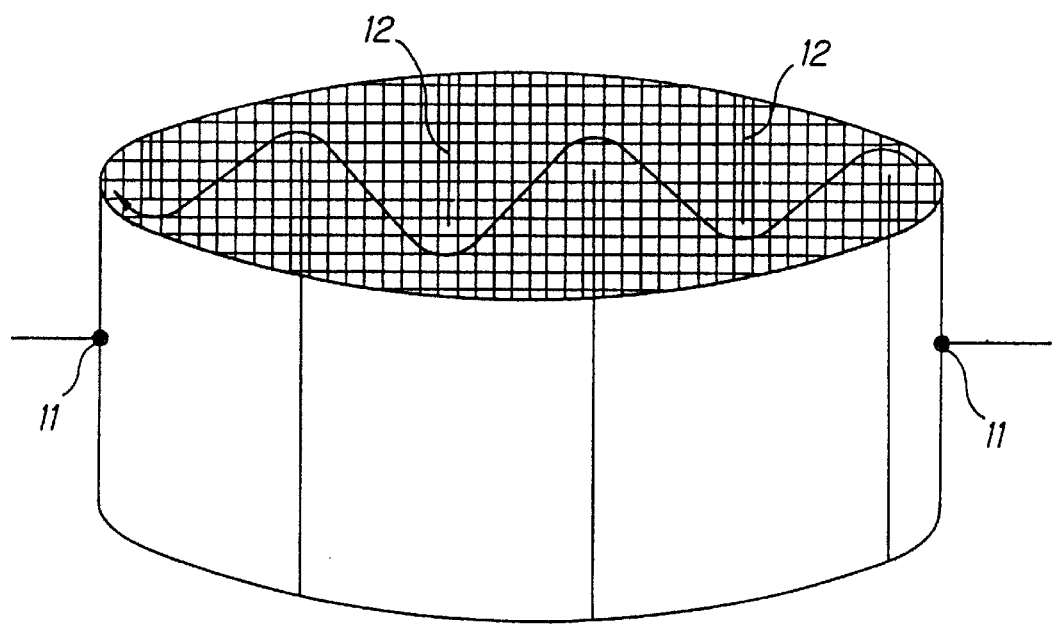
FIG. 13 is an illustrative view showing one embodiment of an electrical heater.

On the obtained honeycomb structure comprising hexagonal cells and having an outer diameter of 93 mm, a thickness of 25 mm, a wall thickness of 0.1 mm and a cell density of 450 cells/$in^2$, six slits 12 were formed in a direction parallel with the axis of a through hole by a grounding treatment using a diamond saw so that the number of the cell between the slits might be 7 and so that the resistance of a heater might be 50 m$\Omega$, as shown in FIG. 13.

Next, the heater was coated with the same catalyst layer as the catalyst A and provided with a pair of electrodes 11, and the heater was then received in a can made of stainless steel, while insulated from the can. The effective volume of the heater was 0.13 l.

Purification System and Evaluation

The above-mentioned Systems A to H shown in FIGS. 4 to 11 were constituted by the use of the catalysts, the adsorbents and the electrical heater obtained above. In order to evaluate the exhaust gas purification performance of these systems, an FTP test (an LA-4 mode) of a system in which 6 cylinders were divided into an adsorption flow path and a catalyst flow path each having 3 cylinders was made by the use of a test car on which a V-type 6-cylinder engine having a displacement of 3,800 cc was carried. In this case, a predetermined amount of secondary air was fed through feed orifices in a simple manner by means of an air pump to obtain an oxygen-excess exhaust gas. After engine cranking, electric power was applied to the electrical heater for 30 seconds (2 KW) by the use of a 12 V battery.

The exhaust gas was collected by a CVS method, and an emission value was then calculated. Table 1 shows the details of constitutions and operations of the systems, and Table 2 shows the test results.

TABLE 1

| System | Position of Catalyst | | | Position of Heater | Position of Adsorbent |
|---|---|---|---|---|---|
| | Catalyst A | Catalyst B | Catalyst C | | |
| A | 0.35 | — | — | — | 0.6 |
| B | 0.45 | — | — | 0.35 | 0.6 |
| C | 0.55 | — | — | 0.35 | 0.6 |
| D | 0.35 | — | — | 0.80 | 0.6 |
| E | 0.85 | 0.45 | 0.35 | 0.35 | 0.45 |
| F | 0.55 | — | — | 0.35 | 0.45 |
| G | 0.55 | — | — | 0.60 | 0.35 |
| H | 0.85 | 0.45 | — | 0.35 | 0.45 |

Each position of the catalyst, the heater and the adsorbent means a distance (m) from an exhaust manifold orifice to the top of each carrier (a honeycomb structure).

Flow Rate and Feed Time of Secondary Air

| System | Feed Orifice A | Feed Orifi6e B | Feed Orifice C |
|---|---|---|---|
| A | 170 $\mu$/min<br>0–100 sec, Constant | 170 $\mu$/min<br>30–100 sec, Constant | — |
| B | 170 $\mu$/min<br>0–100 sec, Constant | Max 170 $\mu$/min<br>30–100 sec, Variabie | — |
| C | 170 $\mu$/min<br>0–100 sec, Constant | Max 170 $\mu$/min<br>30–100 sec, Variabie | — |
| D | 170 $\mu$/min<br>0–100 sec, Constant | 170 $\mu$/min<br>30–100 sec, Constant | — |
| E | 170 $\mu$/min<br>0–100 sec, Constant | 100 $\mu$/min<br>50–100 sec, Constant | 170 $\mu$/min<br>0–50 sec, Constant |
| F | 170 $\mu$/min<br>0–100 sec, Constant | i00 $\mu$/min<br>50–100 sec, Constant | 170 $\mu$/min<br>0–50 sec, Con.stant |
| G | 170 $\mu$/min<br>0–100 sec, Constant | 100 $\mu$/min<br>60–120 sec, Constant | 170 $\mu$/min<br>0–60 sec, Constant |
| H | 170 $\mu$/min<br>0–100 sec, Constant | 100 $\mu$/min<br>50–100 sec, Constant | 170 $\mu$/min<br>0–50 sec, Constant |

With regard to the flow. rate and the feed time of secondary air, for example, "30–100 sec" means that the feed of secondary air was started after 30 seconds from engine cranking, and the feed was stopped after 100 seconds. "Constant" means that secondary air was fed at a constant flow rate, and "Variable" means that secondary air was fed under regulation by an output of an $O_2$ sensor.

TABLE 2

| Example No. | System | Adsorbent | HC Emission | |
|---|---|---|---|---|
| | | | Bag 1A (g) | Total (g/mile) |
| 1 | A | A | 0.84 | 0.068 |
| 2 | B | A | 0.64 | 0.049 |
| 3 | C | A | 0.58 | 0.046 |
| 4 | D | k | 0.73 | 0.058 |
| 5 | E | A | 0.34 | 0.036 |
| 6 | F | A | 0.68 | 0.052 |
| 7 | G | A | 0.80 | 0.063 |
| 8 | H | A | 0.31 | 0.031 |
| 9 | E | B | 0.27 | 0.033 |

Bag 1A (g): HC emission amount emitted within 140 seconds from engine cranking.

According to the above-mentioned test results, the following matters will be apparent:

(1) Even in a V-type large engine in which the decrease in the emission is difficult, a high purification performance can be obtained.

(2) By using the EHC together, the purification performance can be further improved. In the case of the V-type engine, in general, it is most effective for the decrease in the emission to carry two EHCs on each bank, but even by carrying one EHC, the sufficient purification performance can be exerted at a low electric power.

(3) Heretofore, in order to obtain the high purification performance of the purification system using an adsorbent, a by-pass system is necessary. However, according to the present invention, such an effect can be obtained by a simple in-line system.

(4) In this connection, the emission values of CO and $NO_x$ were as low as 1.5 to 2.5 g/mile and 0.15 to 0.22 g/mile in all, respectively, in every system.

As described above, according to the present invention, harmful substances present in the exhaust gas, particularly HC and the like generated in large quantities at the time of a cold start can be extremely effectively purified without requiring an intricate system such as a by-pass system.

What is claimed is:

1. An exhaust gas purification system for purifying exhaust gas flowing therethrough from an internal combustion engine, comprising:
   a catalyst flow path including at least one catalyst for treating harmful components in the exhaust gas;
   an adsorbent flow path including an outlet and an adsorbent for adsorbing harmful components in the exhaust gas, wherein the outlet of the adsorbent flow path is connected to the catalyst flow path at a position upstream of the catalyst, thereby forming a joint portion; and
   means for maintaining separate flow of the exhaust gas such that the exhaust gas flows through both the catalyst flow path and the adsorbent flow path at a predetermined ratio of flow rates, whereby harmful components in the exhaust gas are adsorbed by the adsorbent in the adsorbent flow path during cold-start of the engine, and the catalyst of the catalyst flow path is activated when harmful components adsorbed by the adsorbent are desorbed with a rise in temperature of the adsorbent.

2. The system of claim 1, further comprising exhaust manifold outlet sections extending from the internal combustion engine, the outlet sections being joined into a single flow path which divides to form the adsorption flow path and the catalyst flow path.

3. The system of claim 1, further comprising at least one of oxidizing gas feed means and fuel-combustion air adjustment means for providing an oxygen-excessive exhaust gas composition.

4. The system of claim 3, wherein said system comprises the oxidizing gas feed means, the oxidizing gas feed means being provided upstream of the catalyst.

5. The system of claim 1, further comprising detecting means for detecting desorption of harmful components from the adsorbent, said detecting means being installed at least between the adsorbent and the joint portion.

6. The system of claim 1, further comprising at least one of oxidizing gas feed means and fuel-combustion air adjustment means for providing an oxygen-excessive exhaust gas composition, and detecting means for detecting desorption of harmful components from the adsorbent, said detecting means being installed at least between the adsorbent and the joint portion and generating a signal for control of said at least one of oxidizing gas feed means and fuel-combustion air adjustment means.

7. The system of claim 1, wherein each of said catalyst and adsorbent comprises a honeycomb structure having a large number of passages which are formed by partition walls, said passages extending parallel with a flow direction of the exhaust gas.

8. The system of claim 1, wherein said catalyst comprises a honeycomb structure comprising (i) a heat-resistant inorganic material, and (ii) a catalyst layer provided on the honeycomb structure, the catalyst layer comprising a heat-resistant oxide containing at least one noble metal.

9. The system of claim 1, wherein said adsorbent comprises a honeycomb structure containing a heat-resistant inorganic material supporting an adsorbent layer comprised mainly of zeolite.

10. The system of claim 9, wherein said zeolite has an Si/Al molar ratio of not less than 40.

11. The system of claim 9, wherein said adsorbent layer contains a catalyst component.

12. The system of claim 9, further comprising a catalyst layer provided on the adsorbent layer.

13. The system of claim 1, further comprising at least one electrical heater provided in the system.

14. The system of claim 13, wherein said electrical heater comprises a honeycomb structure having a pair of electrodes connected thereto, said honeycomb structure comprising a heat-resistant metal material.

15. The system of claim 13, wherein the electrical heater is coated with a catalyst layer.

16. The system of claim 15, wherein said catalyst layer contains a noble metal.

17. The system of claim 13, wherein the electrical heater is coated with an adsorbent layer.

18. The system of claim 17, wherein said adsorbent layer contains a catalyst component.

19. The system of claim 13, wherein said electrical heater is provided downstream of the joint portion.

20. The system of claim 13, wherein said electrical heater is provided upstream of the joint portion.

21. The system of claim 13, further comprising another catalyst in the catalyst flow path, wherein said heater and said another catalyst are provided upstream of the joint portion, said heater being provided upstream of the another catalyst.

22. A method for purifying exhaust, gas from an internal combustion engine, comprising:
   providing an exhaust gas purification system including (i) catalyst flow path including at least one catalyst for treating harmful components in the exhaust gas, and (ii) an adsorbent flow path including an outlet and an adsorbent for adsorbing harmful components in the exhaust gas, wherein the outlet of the adsorbent flow path is connected to the catalyst flow path at a position upstream of the catalyst, thereby forming a joint portion;
   flowing exhaust gas into the exhaust gas purification system at least during cold start of the engine such that the exhaust gas flows simultaneously through both the catalyst flow path and the adsorbent flow path at a predetermined ratio of flow rates, whereby harmful components are adsorbed by the adsorbent in the adsorbent flow path; and
   activating the catalyst in the catalyst flow path upon desorption of the harmful components from the adsorbent with a rise in temperature of the adsorbent.

23. The method of claim 22, further comprising a step of feeding oxidizing gas to the exhaust gas system to provide an oxygen-excessive exhaust gas composition, thereby accelerating activation of the catalyst.

24. The method of claim 22, further comprising a step of adjusting amounts of fuel and combustion air to the engine to provide an oxygen-excessive exhaust gas composition, thereby accelerating activation of the catalyst.

25. The method of claim 22, further comprising a step of detecting desorption of harmful components from the adsorbent, via a detecting means.

26. The method of claim 25, further comprising a step of feeding oxidizing gas to the system, via a signal generated by the detecting means, thereby effectively burning desorbed harmful components by the catalyst.

27. The method of claim 25, further comprising a step of adjusting amounts of combustion air and fuel to the engine, via a signal generated by the detecting means, thereby effectively burning desorbed harmful components by the catalyst.

28. An exhaust gas purification system for purifying exhaust gas flowing therethrough from an internal combustion engine, consisting essentially of:

a catalyst flow path including at least one catalyst for treating harmful components in the exhaust gas;

an adsorbent flow path including an outlet and an adsorbent for adsorbing harmful components in the exhaust gas, wherein the outlet of the adsorbent flow path is connected to the catalyst flow path at a position upstream of the catalyst, thereby forming a joint portion; and means for maintaining separate flow of the exhaust gas such that the exhaust gas flows through both the catalyst flow path and the adsorbent flow path at a predetermined ratio of flow rates, whereby harmful components in the exhaust gas are adsorbed by the adsorbent in the adsorbent flow path during cold-start of the engine, and the catalyst of the catalyst flow path is activated when harmful components adsorbed by the adsorbent are desorbed with a rise in temperature of the adsorbent.

29. A method for purifying exhaust gas from an internal combustion engine, consisting essentially of:

providing an exhaust gas purification system including (i) catalyst flow path including at least one catalyst for treating harmful components in the exhaust gas, and (ii) an adsorbent flow path including an outlet and an adsorbent for adsorbing harmful components in the exhaust gas, wherein the outlet of the adsorbent flow path is connected to thee catalyst flow path at a position upstream of the catalyst, thereby forming a joint portion;

flowing exhaust gas into the exhaust gas purification system at least during cold start of the engine such that the exhaust gas flows simultaneously through both the catalyst flow path and the adsorbent flow path at a predetermined ratio of flow rates, whereby harmful components are adsorbed by the adsorbent in the adsorbent flow path; and activating the catalyst in the catalyst flow path upon desorption of the harmful components from the adsorbent with a rise in temperature of the adsorbent.

* * * * *